United States Patent [19]
Nagoshi et al.

[11] 3,956,425
[45] May 11, 1976

[54] MODIFIER FOR VINYLIDENE CHLORIDE RESIN

[75] Inventors: Fumiya Nagoshi; Hideyuki Arakawa; Masaki Matsuo, all of Kobe, Japan

[73] Assignee: Kanegafuchi Kagaku Kogyo Kabushiki Kaisha, Osaka, Japan

[22] Filed: Apr. 8, 1974

[21] Appl. No.: 458,479

[30] Foreign Application Priority Data
Apr. 10, 1973  Japan.............................. 48-41039

[52] U.S. Cl............................................. 260/878 R
[51] Int. Cl.² ................ C08L 31/04; C08F 263/04
[58] Field of Search .............................. 260/878 R

[56] References Cited
UNITED STATES PATENTS 3,487,129  12/1969  Platzer ........................... 260/878 R
3,547,755  12/1970  Oberst et al. .................... 260/878 R
3,547,756  12/1970  Oberst et al. .................... 260/878 R
3,682,844   8/1972  Schwoegler et al. ............. 260/878 R FOREIGN PATENTS OR APPLICATIONS
1,111,884  5/1968  United Kingdom................. 260/878

*Primary Examiner*—Alan Holler
*Attorney, Agent, or Firm*—Moonray Kojima

[57]  ABSTRACT

A modifier for vinylidene chloride resin which is produced by polymerizing 50 to 20 parts by weight of a vinyl monomer mixture comprising 0 to 60 weight percent methyl methacrylate, 0 to 30 weight percent acrylic acid ester and more than 20 weight percent aromatic vinyl monomer, in the presence of 50 to 80 parts by weight of a rubber latex consisting essentially of ethylene-vinyl acetate copolymer containing 50 to 80 weight percent vinyl acetate.

5 Claims, No Drawings

MODIFIER FOR VINYLIDENE CHLORIDE RESIN

BACKGROUND OF THE INVENTION

This invention relates to modifiers for vinylidene chloride resins, and more particularly to such modifiers containing ethylene-vinyl acetate copolymers.

Vinylidene chloride resin composites are advantageous in that the composites have low permeability to moisture and gases. They are, hence, especially suitable a food wrapping material which preserves foods without adversely affecting their fragrance or taste and without damaging their quality. In order to improve extrusion condition of such composites, plasticizers, such as dioctyl phthalate, dibutyl sebacate, $\alpha$-chloronaphthalene, soybean oil epoxide, and the like have been used.

However, since these compounds are not very compatible with vinylidene chloride resin, they usually exude out from the composite. Thus, composites having such plasticizers are not desirable from the standpoint of sanitation especially when used in direct contact with food because the plasticizer may be transferred to the food.

The foregoing disadvantage can be removed by using polyester plasticizers (e.g. polymer of glycerine or glycols and dibasic acid such as adipic acid, azelaic acid, or sebacic acid), or elastomers instead of the plasticizers of low molecular weight mentioned above. However, polyester plasticizers also have disadvantages in that their film forming property is not always satisfactory and any film containing the polyester plasticizer becomes brittle and fragile at low temperatures. As for film containing elastomer as a plasticizer, it is possible to eliminate the disadvantage that the film becomes brittle and fragile at low temperatures, but still it is generally difficult with elastomers to obtain film composites having antishock property at low temperatures because homogeneous mixing to form transparent film is difficult due to the poor mutual compatibility between the elastomer and the vinylidene chloride resins.

Therefore, it is desirable to develop a modifier for vinylidene chloride resins, which does not exude out from the composite and gives sufficient strength at low temperatures to films made thereof. Also, it is desired that such modifier does not decrease the excellent transparency and low permeability against moisture and gases, which are general advantages of vinylidene chloride resin composites.

Several proposals have been made on solving the foregoing problems involving vinylidene chloride resin composites containing ethylene-vinyl acetate copolymers. Belgium patent 7211565 claims that ethylene-vinyl acetate copolymer is directly mixed with vinylidene chloride resins. Japanese patents 47-11663 and 11664 describe a three component mixture containing ethylene, vinyl acetate and vinyl chloride or alkyl esters of acrylic acid. There are descriptions on graft copolymer composites which are obtained by the polymerization of vinylidene chloride under the presence of (a) ethylene-vinyl acetate copolymer, such as in Japanese Pat. No. 45-5066. (b) a three component copolymer of ethylene, vinyl acetate and vinyl chloride, such as in Japanese Pat. No. 45-39103, and (c) an ethylene-vinyl acetate copolymer and chlorosulphonated polyethylene, such as in Japanese Pat. No. 45-39102. None of these proposals has been entirely satisfactory.

SUMMARY OF THE INVENTION

Accordingly, an object of the invention is to substantially eliminate the disadvantages of the prior art.

Another object of the invention is to obtain a modifier for vinylidene chloride resins which does not exude from the resin composite and which gives strength to films made thereof at low temperatures, without detracting from the advantageous properties of vinylidene chloride resins.

The foregoing and other objects are attained by the invention which encompasses a modifier for vinylidene chloride resin having two components closely combined, one being a rubber component of ethylene-vinyl acetate copolymer and the other being a resin component of a copolymer of a vinyl mixture, such as methyl methacrylate, acrylic acid ester, such as butyl acrylate, or acrylonitrile, or the like and aromatic vinyl compound, such as styrene. The modifier is prepared by post polymerization of 50 to 20 parts by weight of a mixture of vinyl monomers, such as methyl methacrylate, butyl acrylate, acrylonitrile, or the like and more than 20 weight per cent of aromatic vinyl compound, such as styrene, in the presence of 50 to 80 parts by weight of rubber like copolymer of ethylene-vinyl acetate containing 50 to 80 weight percent vinyl acetate. Methyl methacrylate is preferably used in an amount up to 60 weight percent, and acrylic acid ester, such as butyl acrylate, may be used preferably in an amount up to 30 weight percent.

The modifier is a uniform and homogeneous mixture of the rubber like component and the resin component. It may be mixed with the vinylidene chloride resin in the ratio, preferably, in amounts of 1 to 50 parts by weight, and more preferably 5 to 20 parts by weight of modifier, to 100 parts by weight of vinylidene chloride resin.

The invention enjoys the following and other advantages over conventional methods. The modifier obtained by closely mixing the rubber component and resin component is in easily handled powder form. Also, ratio of blending of modifier to vinylidene chloride resin, as well as ratio of rubber component and resin componet, can be varied over a wide range so that composites of vinylidene chloride resin and modifier can be used for various purposes. The aromatic vinyl compound used in the resin is effective for improving the transparency of a film made of the composite.

A feature of the invention is a modifier for vinylidene chloride resin produced by polymerizing 50 to 20 parts by weight of a vinyl monomer mixture comprising 20 weight percent or more aromatic vinyl monomer in the presence of 50 to 80 parts by weight of a rubber like component of ethylene-vinyl acetate copolymer containing 50 to 80 weight percent vinyl acetate.

Another feature of the invention is the polymerization of up to 60 weight percent of methyl methacryalte, up to 30 weight percent butyl acrylate and more than 20 weight percetn styrene, in the presence of ethylenvinyl acetate copolymer having 50 to 80 weight percent vinyl acetate.

A still further feature of the invention is a blend of 100 parts by weight of vinylidene chloride and 1 to 50 and more preferably 5 to 20, parts by weight of the modifier.

The foregoing and other objects, advantages, feature may be better understood with reference to the following detailed description, which is to be construed to be illustrative of the invention, not in any way limiting the invention.

DETAILED DESCRIPTION OF PREFERRED EMBODIMENTS

The content of vinyl acetate in the ethylene-vinyl acetate copolymer used as the rubber component is preferably between 50 and 80 weight percent. A copolymer containing less than 50 weight percent vinyl acetate cannot be demonstrated experimentally and a copolymer emulsion of such a vinyl acetate content is not readily available comercially. In general, reduced content of vinyl acetate causes decrease of compatibility with vinylidene chloride resin. The composite of vinylidene chloride resin and modifier cannot be expected to have the advantageous properties of rubber when the vinyl acetate content of the copolymer is less than 50 weight percent. This is because the glass transition temperature of the composite shows a minimum value at this content. When the content of vinyl acetate is above 80 weight percent, the transparency of the composite of vinylidene chloride resin and modifier became poor for any type and amount of the monomer in the resin component studied. Further, in the case where the content of vinyl acetate exceeds over 80% by weight, the glass transition temperature becomes nearly 0°C, and thus, enough strength as a rubber component can be expected at low temperatures.

In the case when vinyl monomer mixture is polymerized in the presence of rubber latex of ethylene-vinyl acetate copolymer, the amounts of both components are determined as follows: The amount of ethylene-vinyl acetate copolymer is set at 50 to 80 parts by weight. The use of less than 50 parts by weight of the copolymer may permit a wide range of different amounts of vinyl monomer content, which enables formation of a transparent composite of vinylidene and modifier, and causes the modifier to be in the form of easily handled powder, but very little improvement of the strength of the vinylidene resin composite can be obtained.

With the use of over 80 parts by weight of copolymer, it is still possible to obtain a transparent composite, but the modifier is obtained in rubber form, not in powder form. A modifier obtained in rubber form causes trouble in handling, such as drying procedure and cannot be mixed homogeneously with vinylidene chloride resin.

The 20 to 50 parts by weight of vinyl monomer or vinyl monomer mixture containing the aromatic vinyl monomer as an indispensible component, is polymerized in the presence of the ethylene-vinyl acetate copolymer mentioned above. Amounts below 20 parts by weight and above 50 parts by weight produce certain disadvantages such as discussed herein.

It is preferred that the content of the aromatic vinyl monomer be at least 20 weight percent of the vinyl monomer mixture. The aromatic vinyl monomer may be styrene, but is not limited to this compound. ONe of the advantages that the invention enjoys is that a modifier produced from a vinyl monomer mixture containing more than 20 weight percent styrene, for example, imparts to vinylidene chloride resin excellent transparency.

Methyl methacrylate and acrylic acid esters are preferably used as the vinyl monomers, but other monomers such as acrylonitrile which copolymerizes with the above mentioned monomers may be used. The amount of methyl methacrylate should be below 60 weight percent. Use of more than 60 weight percent methyl methacrylate causes the modifier-vinylidene chloride resin composite to be difficult to melt at the film forming process, and causes poor surface condition of the molding product.

Butyl acrylate is preferable among acrylic acid esters and it is preferred to use same in an amount less than 30 weight percent of the vinyl monomer mixture. Addition of this compound improves the fluidity of the vinylidene chloride resin added with modifier, at the extruding process and thus contributes to easy forming property without changing the conventional extruding conditions. This is another distinct advantage of the present invention. However, the excess use of the acrylic ester in an amount more than 30 weight percent may cause the modifier to be difficult to mix with the vinylidene chloride resins in powder form.

The term "vinylidene chloride resin" as used herein may be defined as a vinylidene chloride copolymer consisting essentially of vinylidene chloride and at least one copolymerizable monomer selected from the group consisting of vinyl chloride, vinyl acetate, acrylonitrile, and the like, and mixtures thereof. The copolymer may contain a small amount of plasticizer, heat-stabilizer and light stabilizer.

A method of producing modifiers is as follows: Most of the various types of ethylene-vinyl acetate copolymer latex employed in the present invention are products readily available on the commercial market. Into the above monomer mixture organic peroxide may be dissolved and the monomer mixture may be dropped continuously into the latex. The polymerization may proceed concurrently with addition of peroxide. The temperature of polymerization ranged from 30° to 60°C., and the reaction was performed under stirring in an atmosphere of nitrogen.

In the process in which the vinyl monomer mixture is dropped into the latex, ethylene-vinyl acetate copolymer latex occasionally may become unstable. A small amount of emulsifier may be added to improve the stability of the latex.

After a predetermined time interval, the dropping of vinyl monomer mixture and peroxide ended and a small amount of polymerization initiator was added to complete the polymerization.

Employing conventional procedure, the latex so formed was subjected to salting out, filtered, washed with water, and dried to produce the inventive modifier comprising the rubber component and resin component, which were homogeneneously and intimately mixed with each other.

The present objects may be attained by well mixing both the resin component and rubber component. The mixing procedure may be performed by a conventional dry-blending method.

Any desired proportion of the modifier to the vinylidene chloride resin may be selected, but it is preferred to use 1 to 50 parts by weight, and more preferably 5 to 20 parts by weight, of the modifier to 100 parts by weight of the vinylidene chloride resin. The vinyl chloride resin may be kneaded, compounded, blended or otherwise suitably mixed with the modifier, kneading being on preferred method.

The following examples are given to further illustrate, not limit, the invention.

EXAMPLES 1 to 5.

Into a four-necked flask of 1 liter content, equipped with a stirrer, a cooler, an inlet pipe for nitrogen gas, a thermometer and a pipe for dropping monomer mixture, was supplied 180 g (60 parts by weight) of ethylene-vinyl acetate copolymer latex as solid constituent. To the latex was added 0.5 g of aqueous solution of sodium formaldehyde sulfoxide as a reducing agent in a redox-initiation system. Water was added to adjust the total weight of reacting mixture to 600g.

Ethylene-vinyl acetate copolymers used for the respective examples were of commercial grade or laboratory synthesized product and had, respectively, 85, 85, 80, 75 and 68 weight percent of vinyl acetate content, which were assayed from oxygen analysis.

Raising the temperature up to 60°C, 120 g (40 parts by weight) of a vinyl monomer mixture consisting essentially of styrene, methyl methacrylate and butyl acrylate in amounts shown in Table 1 hereinbelow and which contained 0.5 g of t-butyl hydroperoxide was added dropwisely to the latex for 3 hours. The vinyl monomer mixture was liable to cause an unstable state of the latex. ONce attained in the unstable state, 2 g of sodium oleate was added on ocassion.

To complete the polymerization of this vinyl monomer mixture, 0.10 g of t-butyl hydroperoxide was further added and stirring was continued for an additional one hour.

Conversion of the vinyl monomer mixture to copolymer was 90 to 95%. The latex obtained was subjected to salting out with sodium chloride, filtered, washed with water and dried to provide a modifier in which the rubber component and the resin component were homogeneously and intimately mixed.

Samples were made by the following procedure. There were mixed 10 parts by weight of modifier produced using different amounts of vinyl acetate in the ethylene-vinyl acetate copolymer, 100 parts by weight of vinylidene chloride resin containing 78 parts by weight vinylidene chloride, 15 parts by weight of vinyl chloride, 2 parts by weight of soy-bean oil epoxide and 5 parts by weight of dioctyl adipate. From the mixture so formed sheet-like test pieces, each being of 8 mm in thickness were molded using a conventional extruder with a flat die. Molding was performed using a 20 mm type extruding machine under the following condition: four screw, L/D = 20; compression ratio = 3.0; extruding temperature = 120° to 150°C; and temperature at die part = 155°C.

The transparency and the surface flatness of the test pieces were evaluated with inspection using the naked eye.

As can be seen from Table 1, the use of modifier prepared from ethylene-vinyl acetate copolymer containing 80% or more vinyl acetate is inferior in transparency to that prepared from copolymer containing less than 80% vinyl acetate.

TABLE 1

| Sample No. | Vinyl acetate content in copolymer of ethylene-vinyl acetate (%) | Composition of vinyl monomer mixture (parts by weight) | | | Transparency | Surface flatness |
|---|---|---|---|---|---|---|
| | | styrene | methyl methacrylate | butyl acrylate | | |
| 1 | 85 | 12 | 15 | 3 | X | O |
| 2 | 85 | 15 | 20 | 5 | X | O |
| 3 | 80 | 15 | 20 | 5 | Δ | O |
| 4 | 75 | 15 | 20 | 5 | O | O |
| 5 | 68 | 15 | 20 | 5 | O | O |

Note: See Table 2 for definitions of symbols.

EXAMPLES 6 to 11

To 60 parts of ethylene-vinyl acetate copolymer containing 68% vinyl acetate, 40 parts of vinyl monomer mixture with the different compositions set forth in Table 2 were added and the resulting mixture was polymerized to produce a modifier using the same procedure as setforth in the preceding examples. The percents and parts are by weight.

Samples were prepared by mixing the resulting modifiers resulting from use of different types and amounts of vinyl monomer mixture components, with vinylidene chloride resin, such as set forth in the preceding examples.

The compounding ratio, molding condition, etc were the same as set forth in the preceding examples.

From Table 2, it can be seen that styrene component helps to increase transparency of the samples. Increasing the methyl methacrylate content in the copolymer tends to increase damages in surface flatness. Increasing butyl acrylate content in the copolymer tend to produce difficulties in the homogeneous mixing of the modifier with vinylidene chloride resin and the mixture was found to tend to form a block.

With adding the above modifier, the tensile strength of the vinylidene chloride resin mold decreases. The elongation increases in an appropriate range of composition. Also, the modifier give pliability to resultant mold articles.

TABLE 2

| Sample No. | Composition of resin (parts by wt) | | | Transparency | Surface flatness | Tensile* strength kg/cm² | Elongation (%) |
|---|---|---|---|---|---|---|---|
| | Styrene | Methyl methacrylate | Butyl acrylate | | | | |
| 6 | 0 | 40 | 0 | Δ | X | 189 | 41 |
| 7 | 0 | 30 | 10 | Δ | Δ | 193 | 44 |
| 8 | 5 | 25 | 10 | Δ | Δ | 191 | 60 |
| 9 | 10 | 20 | 10 | O | O | 193 | 63 |
| 10 | 15 | 20 | 5 | O | O | 188 | 53 |

TABLE 2-continued

| Sample No. | Composition of resin (parts by wt) | | | Transparency | Surface flatness | Tensile* strength kg/cm² | Elongation (%) |
| --- | --- | --- | --- | --- | --- | --- | --- |
| | Styrene | Methyl methacrylate | Butyl acrylate | | | | |
| 11 | 20 | 0 | 20 | Product could not be pulverized and homogeneous mixing was not available | | | |
| 12 | 20 | 20 | 0 | ⊚ | O | 202 | 63 |
| 13 | 25 | 10 | 5 | ⊚ | O | 193 | 72 |
| Control | No modifier added | | | ⊚ | O | 224 | 48 |

Note:
Transparency Column
X - opalescent
O - transparent
Δ - semitransparent
⊚ - excellent Surface flatness column
X - nongelatinized parts
Δ - somewhat such
O - no such

*Extruded sheet-samples were tested at tensile speed of 50 mm/min at 23°C. Tensile strength values were measured at the yield point. Ultimate elongation values were measured at the breaking point.

As can be seen from the above examples, the modifier prepared according to the process of this invention, has an advantage in that the compounding of vinylidene chloride resin with the modifier provides novel and useful resin composites having nearly the same pliability and transparency as that of vinylidene chloride resin without use of conventional plasticizers which has the commercially undesirable deficiency of sweating out.

The foregoing description is for purposes of illustrating the principles of this invention. Numerous other variations and modifications thereof would be apparent to the worker skilled in the art. All such variations and modifications are to be considered to be within the spirit and scope of this invention.

What is claimed is:

1. A modifier for vinylidene chloride resin produced by polymerizing 50 to 20 parts by weight of a vinyl monomer mixture consisting essential of one or more vinyl monomers and at least 20 weight percent aromatic vinyl monomer, in the presence of 50 to 80 parts by weight of a rubber in latex form consisting essentially of ethylene-vinyl acetate copolymer containing 50 to 80 weight percent vinyl acetate.

2. The modifier of claim 1, wherein said vinyl monomers consist essentially of 0 to 80 weight percent methyl methacrylate, 0 to 30 weight percent acrylic acid ester, and wherein said aromatic vinyl monomer is styrene.

3. The modifier of claim 2, wherein said vinyl acetate is in an amount of 68 to 75 weight percent and wherein said styrene is in an amount of 20 to 25 weight percent.

4. A modifier for vinylidene chloride resin copolymer of vinylidene chloride and a monomer selected from the group consisting of vinyl chloride, vinyl acetate, acrylonitrile, and mixtures thereof copolymerizable therewith, said modifier obtained by polymerizing at a temperature of from 30° to 60°C and using an emulsifier to improve stability, 50 to 20 parts by weight of a resin component consisting essentially of up to 60 weight percent methyl methacrylate, up to 30 weight percent butyl acrylate, and 20 weight percent or more styrene, in the presence of 50 to 80 parts by weight of a rubber component in latex form consisting essentially of ethylene-vinyl acetate copolymer containing 50 to 80 weight percent vinyl acetate, whereby said resin component and said rubber component are uniformly and homogeneously mixed.

5. Modifier of claim 4, wherein the resin component is mixed with organic peroxide and then added to said latex, and wherein the product of said polymerization is subsequently salted out, filtered, washed with water and dried.

* * * * *